US008311876B2

(12) United States Patent
House

(10) Patent No.: US 8,311,876 B2
(45) Date of Patent: Nov. 13, 2012

(54) COMPUTER-IMPLEMENTED SYSTEMS AND METHODS FOR BEHAVIORAL IDENTIFICATION OF NON-HUMAN WEB SESSIONS

(75) Inventor: William Jeffrey House, Clayton, NC (US)

(73) Assignee: SAS Institute Inc., Cary, NC (US)

( * ) Notice: Subject to any disclaimer, the term of this patent is extended or adjusted under 35 U.S.C. 154(b) by 179 days.

(21) Appl. No.: 12/420,992

(22) Filed: Apr. 9, 2009

(65) Prior Publication Data
US 2010/0262457 A1 Oct. 14, 2010

(51) Int. Cl.
G06Q 10/00 (2012.01)
G06Q 30/00 (2012.01)
G06F 15/173 (2006.01)
H04H 60/32 (2008.01)

(52) U.S. Cl. .......... 705/7.29; 709/224; 725/19
(58) Field of Classification Search .......... None
See application file for complete search history.

(56) References Cited

U.S. PATENT DOCUMENTS

| | | | |
|---|---|---|---|
| 7,092,926 B2 | 8/2006 | Cerrato | |
| 7,516,220 B1* | 4/2009 | Stiert | 709/225 |
| 7,657,626 B1* | 2/2010 | Zwicky | 709/224 |
| 2002/0087679 A1* | 7/2002 | Pulley et al. | 709/224 |
| 2003/0187677 A1 | 10/2003 | Malireddy et al. | |
| 2006/0136294 A1* | 6/2006 | Linden et al. | 705/14 |
| 2007/0011039 A1 | 1/2007 | Oddo | |
| 2007/0078983 A1* | 4/2007 | Modrall | 709/226 |
| 2008/0004107 A1* | 1/2008 | Nguyen et al. | 463/29 |
| 2008/0162200 A1* | 7/2008 | O'Sullivan et al. | 705/7 |
| 2008/0162475 A1* | 7/2008 | Meggs et al. | 707/6 |
| 2008/0281606 A1* | 11/2008 | Kitts et al. | 705/1 |
| 2008/0301090 A1* | 12/2008 | Sadagopan et al. | 707/3 |
| 2008/0301808 A1* | 12/2008 | Calo et al. | 726/23 |
| 2009/0094311 A1* | 4/2009 | Awadallah et al. | 709/202 |
| 2009/0112918 A1* | 4/2009 | Terrell | 707/102 |
| 2009/0125719 A1* | 5/2009 | Cochran et al. | 713/171 |
| 2010/0037147 A1* | 2/2010 | Champion et al. | 715/751 |
| 2010/0070620 A1* | 3/2010 | Awadallah et al. | 709/224 |
| 2010/0095374 A1* | 4/2010 | Gillum et al. | 726/22 |
| 2010/0241974 A1* | 9/2010 | Rubin et al. | 715/764 |
| 2011/0131652 A1* | 6/2011 | Robinson et al. | 726/22 |

OTHER PUBLICATIONS

Daswani et al. "Online Advertising Fraud" (2008) Symantec Press.*
van Meer, Geoffrey J.L. et al., "A suitable research methodology for analyzing online banking behaviour", http://www.arraydev.com/commerce/jibc/0402-04.html, 12 pp.
Judah Phillips Weblog, WebAnalyticsDemystified, Archive for 'Web 2.0', http://judah.webanalyticsdemystified.com/category/web-20/page/2, 17 pp.

* cited by examiner

Primary Examiner — Romain Jeanty
Assistant Examiner — Sujay Koneru
(74) Attorney, Agent, or Firm — Jones Day

(57) ABSTRACT

Computer-implemented systems and methods are provided for analyzing session data generated by a website in response to a visitor requesting data from the website. A system and method can be configured for receiving the session data and analyzing the session data to determine a plurality of website interaction behavioral metrics of the session data. The website interaction behavioral metrics of the session data are compared to detection settings. A determination is made as to whether the visitor to the website was human or non-human based upon the comparing step.

22 Claims, 7 Drawing Sheets

COMPUTER-IMPLEMENTED SYSTEMS AND METHODS FOR BEHAVIORAL IDENTIFICATION OF NON-HUMAN WEB SESSIONS

TECHNICAL FIELD

The technology described herein relates generally to systems and methods for analyzing web session data. More specifically, the technology described herein relates to behavioral identification of web sessions of non-human visitors to a website.

BACKGROUND

With web servers receiving millions of requests for content on a daily basis, a need has arisen to be able to discern whether the request actually is from a human or a non-human, such as an automated program (e.g., web crawlers, pingers, spiders, robots, etc.). Previous approaches for non-human visitor detection involve the storage of data-centric characteristics of a visitor (e.g., IP addresses, user agents, and other data components). These approaches are limiting because of the unreliable nature of the data characteristics relied upon with these approaches. Examples of limiting factors of these approaches include:

1. IP addresses often change.
2. User agent strings change.
3. Not all non-human visitors properly identify themselves. Often this is intentional on the part of the computer program visiting the site, in order to bypass filtering systems.
4. Pingers only occasionally access the web site (to ensure that it is still up), so their traffic tends to be small but persistent in nature. This makes it difficult to immediately spot them for filtering.

The result is inaccurate and skewed web analysis, with either inflated numbers because of the erroneous inclusion of non-human visitors, or worse, the accidental deletion of real visitor data from the analysis.

SUMMARY

In accordance with the teachings provided herein, systems and methods for operation upon data processing devices are provided to analyze session data generated by a website in response to a visitor requesting data from the website. As an example, a system and method can be configured for receiving the session data and analyzing the session data to determine a plurality of website interaction behavioral metrics of the session data. The website interaction behavioral metrics of the session data are compared to detection settings. A determination is made as to whether the visitor to the website was human or non-human based upon the comparing step.

As another example, a system and method can be configured for receiving the session data and analyzing the session data to determine a plurality of website interaction behavioral metrics of the session data. The website interaction behavioral metrics of the session data are compared to detection settings. The detection settings are threshold values for detecting whether session data results from a human visitor or a non-human visitor. A determination is generated as to whether the visitor to the website was human or non-human based upon the comparing step. The generated determination is provided to a computer-readable storage medium and is indicative of whether website activity associated with the visitor comprises human or non-human website activity. The detection settings are tuned to alter how aggressively website interaction behavioral metrics are attributed to non-human visitors.

DETAILED DESCRIPTION

Figure 1:
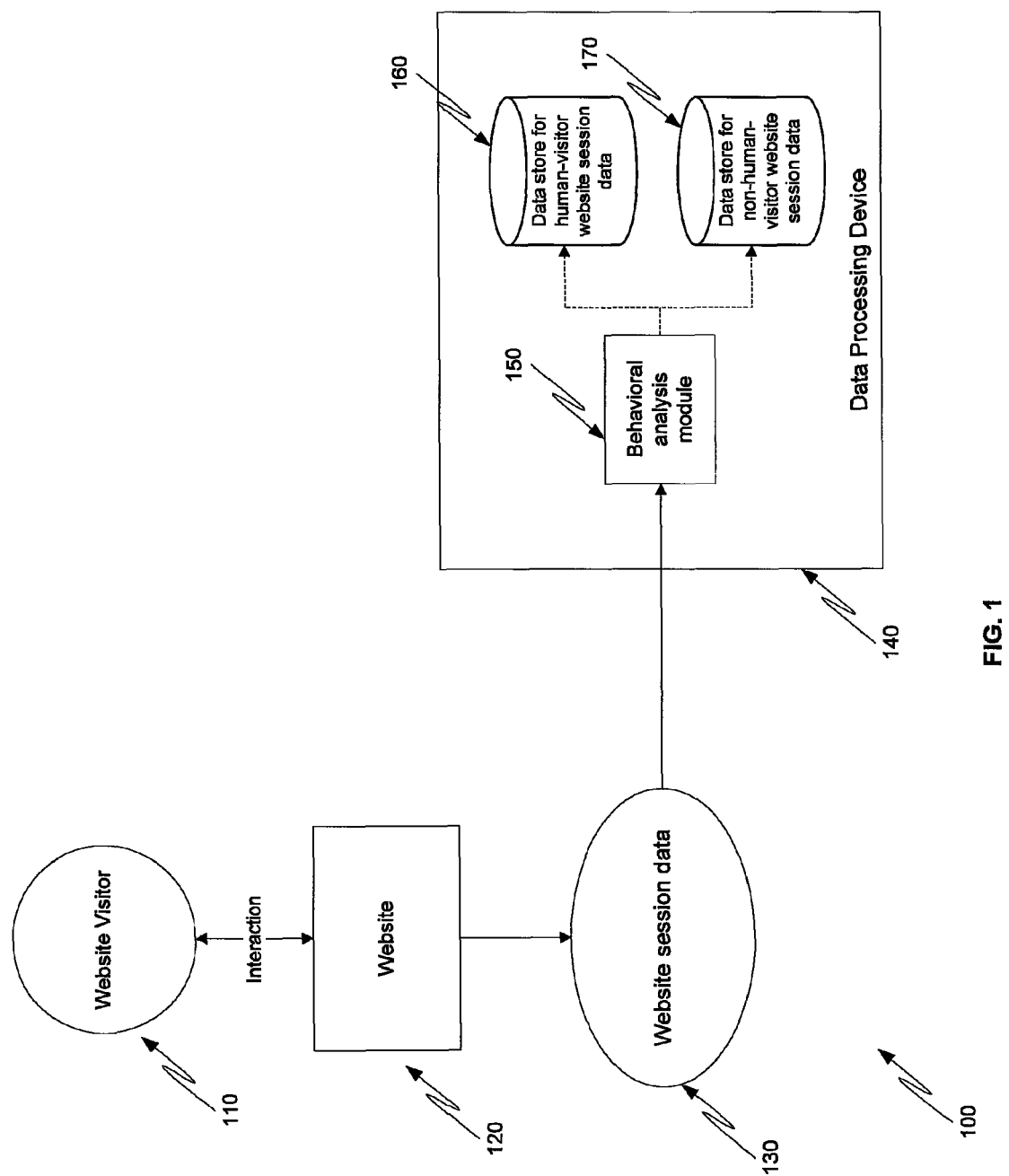
FIG. 1 is a block diagram depicting elements of an example system for behavioral identification of non-human web sessions occurs.

FIG. 1 depicts at 100 an example system for behavioral identification of non-human web sessions. As shown in FIG. 1, a website visitor 110 interacts with a website 120. Such interactions generally take the form of requests transmitted by the website visitor to the website 120, along with responses transmitted from the website 120 to the website visitor, which generally comprise web pages that satisfy the request of the website visitor 110. A set of requests from a website visitor 110 and/or the responses from a website 120 may be referred to as a web session.

Many websites use software that is capable of generating session data for a web session. Thus, website 120 may produce website session data 130. Website session data 130 may be stored in various formats, including as clickstream data. An entity that operates a website may use session data for various purposes, including monitoring the performance of the website or determining reimbursements for an advertising website that refers website visitors to the entity's website. Because session data may be used for vital business purposes, ensuring the accuracy of the session data is important.

One aspect of session data that can result in inaccurate or skewed web analysis results is the proliferation of non-human visitors to websites. These non-human visitors generally take the form of computer programs designed for a particular purpose, such as bots that are used to index large numbers of web pages or pingers that are designed to monitor the availability of websites. Requests transmitted to a website by non-human visitors may be indistinguishable on their face from requests transmitted to the same website by human visitors, as the request contains a limited number of data fields that may relatively easily be populated programmatically. Thus, analysis of aspects of the non-human-visitor requests other than the data fields they contain can provide additional information to facilitate the identification of non-human website visitors.

In order to identify a non-human visitor, the website session data 130 is provided as input to a data processing device 140 (e.g., a computer system). The data processing device may include a behavioral analysis module 150. The example behavioral analysis module 150 analyzes the website session data in order to categorize the session data as having been generated either by a human visitor, in which case the session data may be stored in data store 160, or by a non-human visitor, in which case the session data may be stored in data store 170. In this way, the entity that operates the website can choose either data set for purposes of analyzing the session data generated by whichever type of visitor is of interest. It should be understood that storage of the categorized session data can be done in many different ways. For example, a single data store may be used to store both types of categorized session data (with associated identifiers to designate in which category a particular session data record belongs). As another example and if desired by the situation at hand, only one type of session data could be stored (e.g., only human-visitor website session data is stored or only non-human-visitor website session data is stored).

Figure 2:
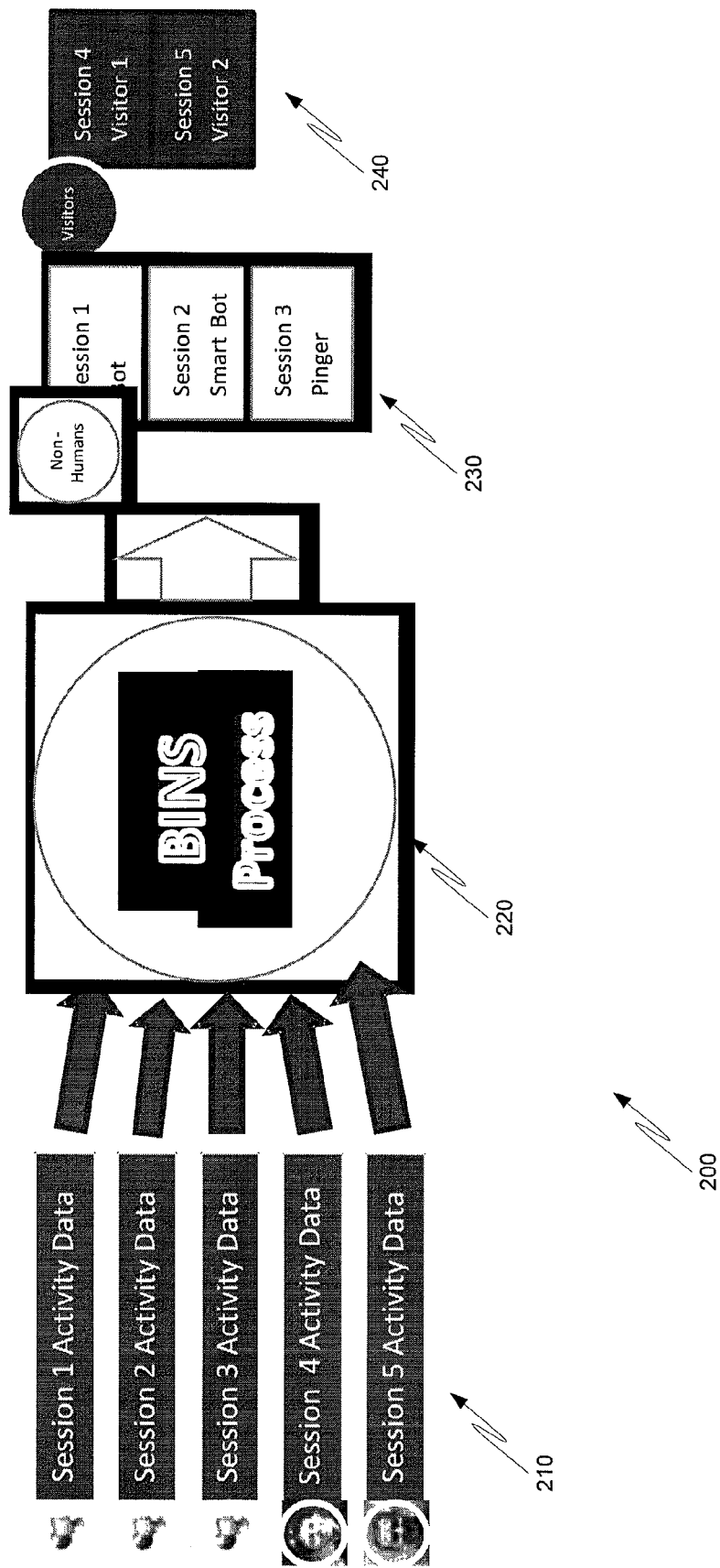
FIG. 2 is a block diagram depicting inputs and outputs of an example system of behavioral identification of non-human web sessions (BINS Process).

FIG. 2 depicts at 200 an example system for behavioral identification of non-human web sessions. At 210, session data for five visitor sessions is illustrated. Three of the visitor sessions correspond to non-human visitors and the other two sessions correspond to human visitors. Data for each session is input to the BINS (Behavioral Identification of Non-human Sessions) Process 220. The BINS Process 220 categorizes each visitor session as either a non-human visitor session 230 or a human visitor session 240.

Figure 3:
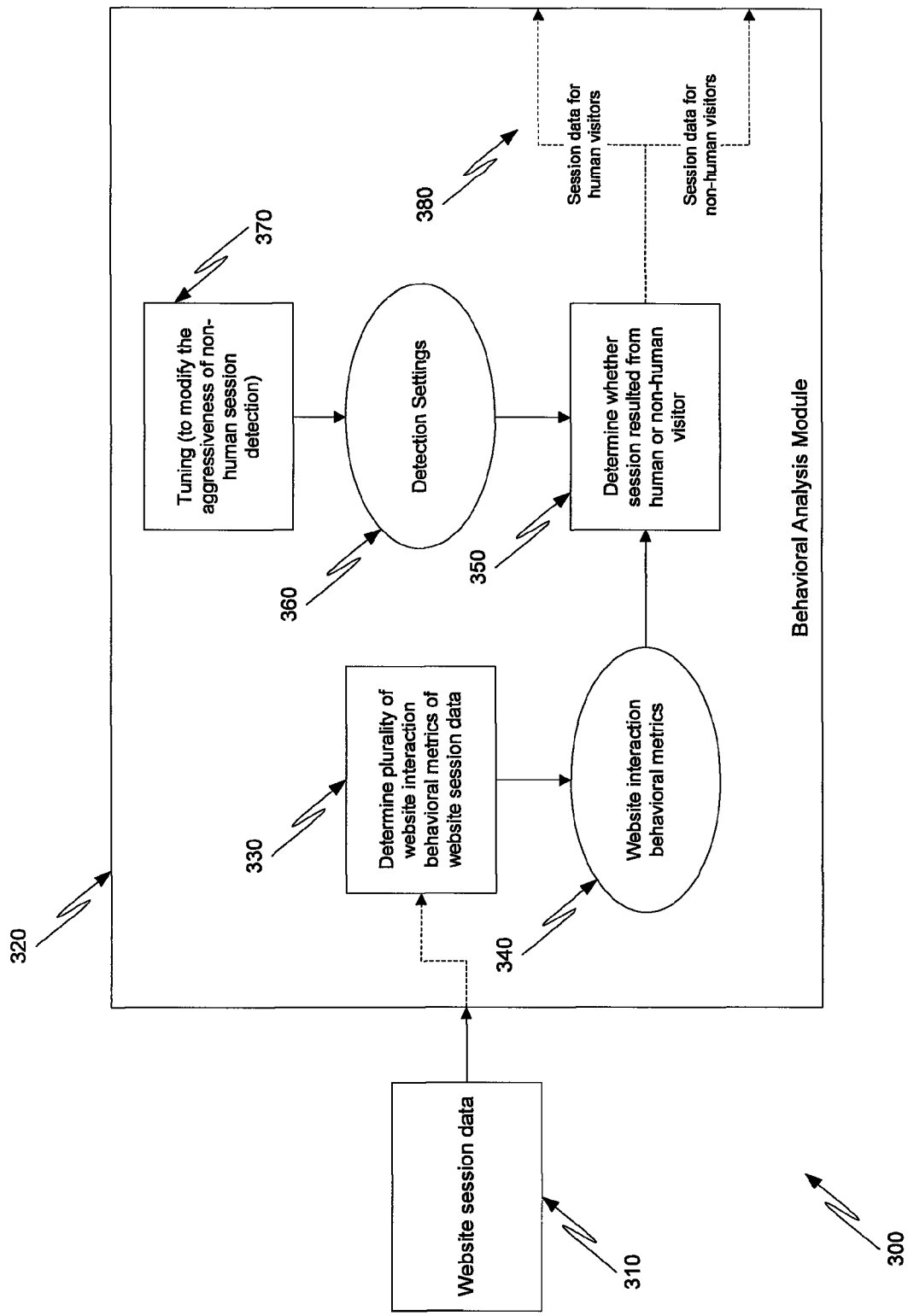
FIG. 3 is a block diagram depicting elements of a behavioral analysis module that implements an example method of behavioral identification of non-human web sessions.

FIG. 3 depicts at 300 an example system for behavioral identification of non-human web sessions. Website session data 310 is input to a behavioral analysis module 320. The behavioral analysis module 320 determines values for a plurality of website interaction behavioral metrics, as shown at 330. These metrics may be derived from data in the visitor requests themselves and/or the module 320 may derive metrics from aspects of the visitor requests other than the data fields. The result is a set of website interaction behavioral metrics 340. These metrics may be used as a basis for further processing at 350 in order to determine whether the visitor requests in the session data were made by a non-human visitor. The processing at 350 makes this determination based upon the website interaction behavior metrics 340 and detection settings 360. The detection settings 360 are created when a user of the system 300 adjusts one or more tuning parameters available within the system, as shown at 370. The tuning parameters determine how sensitive the system 300 is with respect to determining whether a particular session was the result of a non-human visitor to the website. Once a determination is made at 350 whether the session data resulted from a human or non-human visitor to the website, the module 320 outputs separately session data attributed to human visitors and session data attributed to non-human visitors, as depicted at 380.

Figure 4:
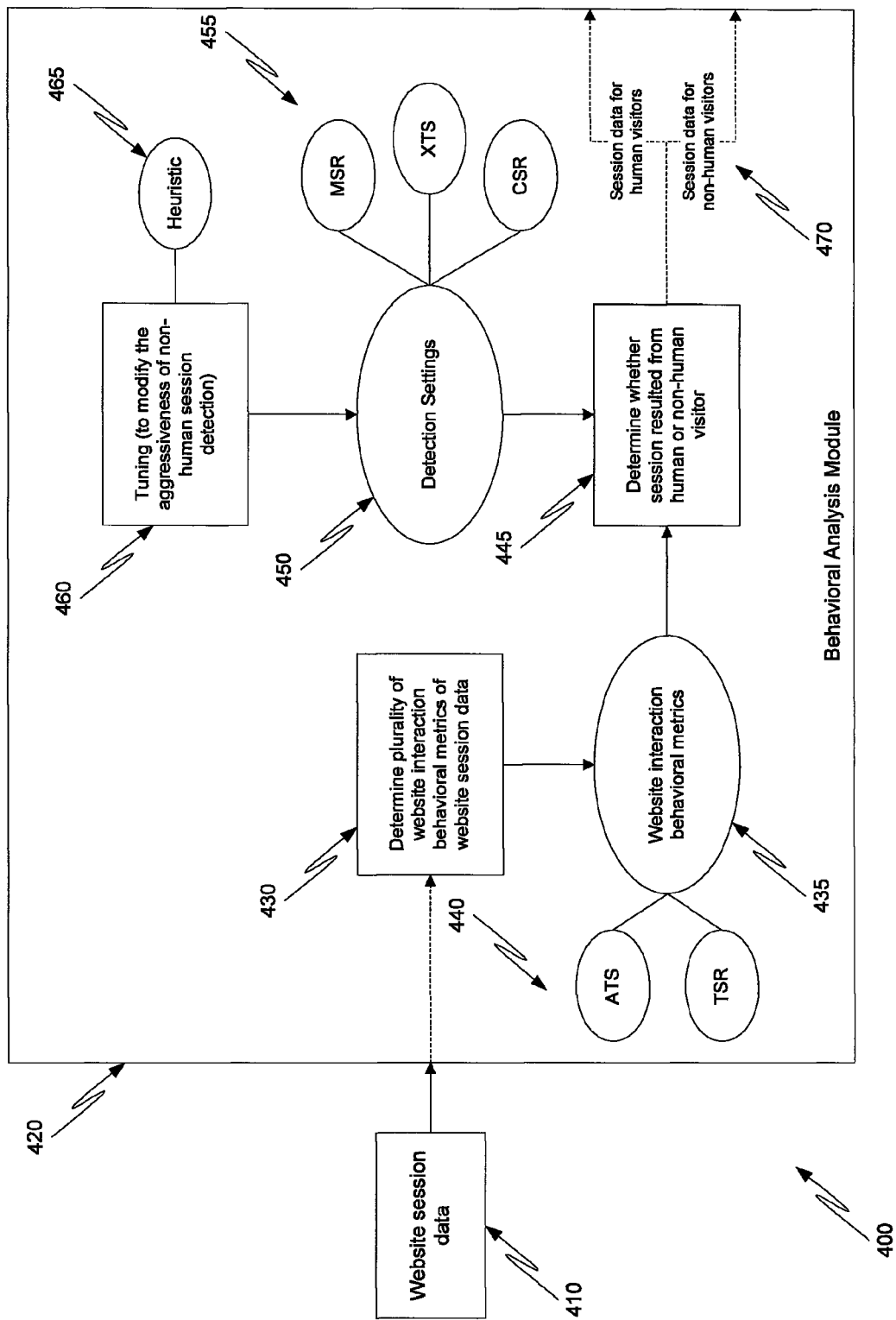
FIG. 4 is a block diagram depicting elements of a behavioral analysis module that implements another example method of behavioral identification of non-human web sessions.

FIG. 4 shows details of another example system 400 for behavioral identification of non-human web sessions. Similar to the example system depicted in FIG. 3, website session data 410 is input to a behavioral analysis module 420. At 430, the module 420 determines values for a plurality of website interaction behavioral metrics. The result is a set of website interaction behavioral metrics 435. As shown at 440, examples of metrics that may be determined from a set of web session data include the Average Time Spacing between requests (ATS) and the Total Session Requests (TSR) for a particular web session. The ATS and TSR metrics can be used to effectively identify behavior patterns of non-human visitors to a website.

One example of such a non-human visitor is a bot, which may produce a pattern in which the session data shows rapid access to many pages in a short period of time. Such a pattern tends to involve very quickly traversing pages of a web site to gather as much information as possible about the site. Detecting this type of bot is done by computing the average time between each request made to the web server (ATS). A low ATS value indicates activity that occurs too rapidly to be performed by a human visitor.

Another example of such a non-human visitor is a "smart bot," which is a bot that attempts to more closely mimic the behavior of a human website visitor. Smart bots may be characterized by randomly-timed access to large number of pages. In one example, the activity of the smart bot is similar to the activity of the "regular" bot, with one exception: the time between clicks is randomly varied to more closely simulate a real user. Detecting a smart bot in many cases could still be done using the ATS metric, because these bots usually only vary the time between requests within a fixed set of seconds. By their very nature, bots are trying to gather a lot of information as quickly as possible, so often the average time between requests is still low. However, if the time between requests is high enough to make the web session data appear as though it was generated by a human visitor, another metric can be used: Total Session Requests (TSR). Smarter bots still request a lot of content, and thereby have long session lengths. For example, a real visitor will likely not visit 300+ pages in a single sitting. Detecting behavior that results in a high session count therefore can be used to detect this type of bot.

The behavior pattern in which there is slower activity over an extended period of time also may be identified using the TSR metric. The pattern of slower activity over an extended period of time is evident in pingers. A pinger is a program that continually checks for services on a website, to ensure that they are still operational (for example) by making a request to the site, and then repeating that request after a certain interval of time has passed. This time interval can vary (for example, it may be every 5 seconds, or every 15 minutes). Detecting a pinger using ATS is not reliable, as this time is likely to be higher, and look like a real user. Therefore, this behavioral pattern may be detected by examining the TSR metric.

Once the website interaction behavioral metrics 435 are generated, the module proceeds to determine at 445 whether the session data resulted from a human visitor or a non-human visitor. The processing 445 makes use of detection settings 450, which result from a user of the system 400 adjusting one or more tuning parameters available within the system, as shown at 460. A heuristic 465 may also be employed to assist with determining proper values for the tuning 460.

Threshold values for various detection settings 455 may be set as part of the tuning. One example is the Minimum Session Requests (MSR) setting. The MSR setting permits a user of the system to configure the system to ignore sessions that contain a number of sessions less than the MSR. This can be useful for discerning, for example, between a type of non-human visitor designed to retrieve as much information from a website in the shortest time possible and a human visitor who is familiar with a website. In each case, the time between requests may be very short, but a human visitor is extremely unlikely to produce a number of requests comparable to the number of requests that such a non-human visitor would likely generate. Another detection setting that may be configured is the MaXimum Time Spacing (XTS) setting. The XTS setting permits a user to set a value for the ATS beyond which a session will be assumed to result from a human visitor to the website. Thus, if XTS were set to three seconds, then only sessions with ATS values below three seconds would be analyzed further to determine whether the session data results from a human visitor or a non-human visitor. A third example of a detection setting that may be tuned is Certain Session Requests (CSR). The CSR setting specifies the number of requests after which a session will be considered to have resulted from a non-human visitor, independent of the XTS value. This permits detection of non-human visitors that simulate a human being by transmitting requests more slowly, such that the XTS detection setting would not normally cause these sessions to be categorized as non-human visitor sessions. For example, a non-human visitor that transmits a request every eight seconds, but transmits 10,000 requests to the web site would normally not be detected by XTS, but would be detected using the CSR setting.

Once the module 420 has determined whether the session data resulted from a human visitor or a non-human visitor, the session data is categorized appropriately. The module 420 outputs each category of session data separately, as shown at 470.

Figure 5:
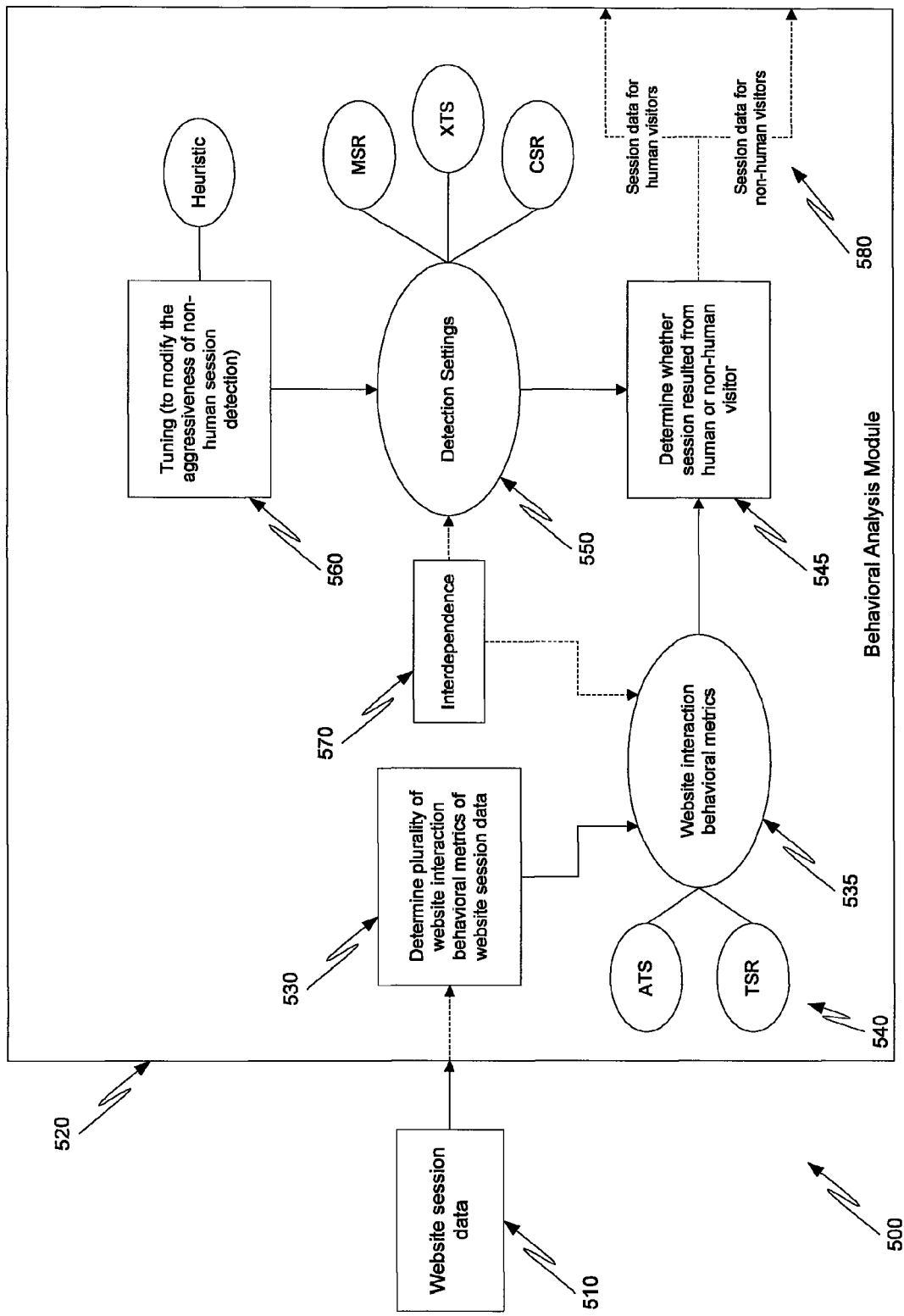
FIG. 5 is a block diagram depicting elements of a behavioral analysis module that implements another example method of behavioral identification of non-human web sessions.

FIG. 5 illustrates another example system 500 for behavioral identification of non-human web sessions. Website session data 510 is input to a behavioral analysis module 520. At 530, a plurality of website interaction behavioral metrics 535 is determined, which may include ATS or TSR, as depicted at 540. At 545, the module determines whether the session results from a human or non-human visitor, making use of detection settings 550, which can be tuned to modify how aggressively non-human visitors are detected, as shown at 560. As further shown in FIG. 5, the detection settings 550 and the website interaction behavioral metrics 535 have an interdependency 570 such that tuning the detection settings affects how the website interaction behavioral metrics are used to determine whether a session results from a human or non-human visitor. By comparing output 580 from the module with data generated by known non-human visitors, the detection settings 550 can be modified to tune 560 the aggressiveness of non-human session detection.

Figure 6:
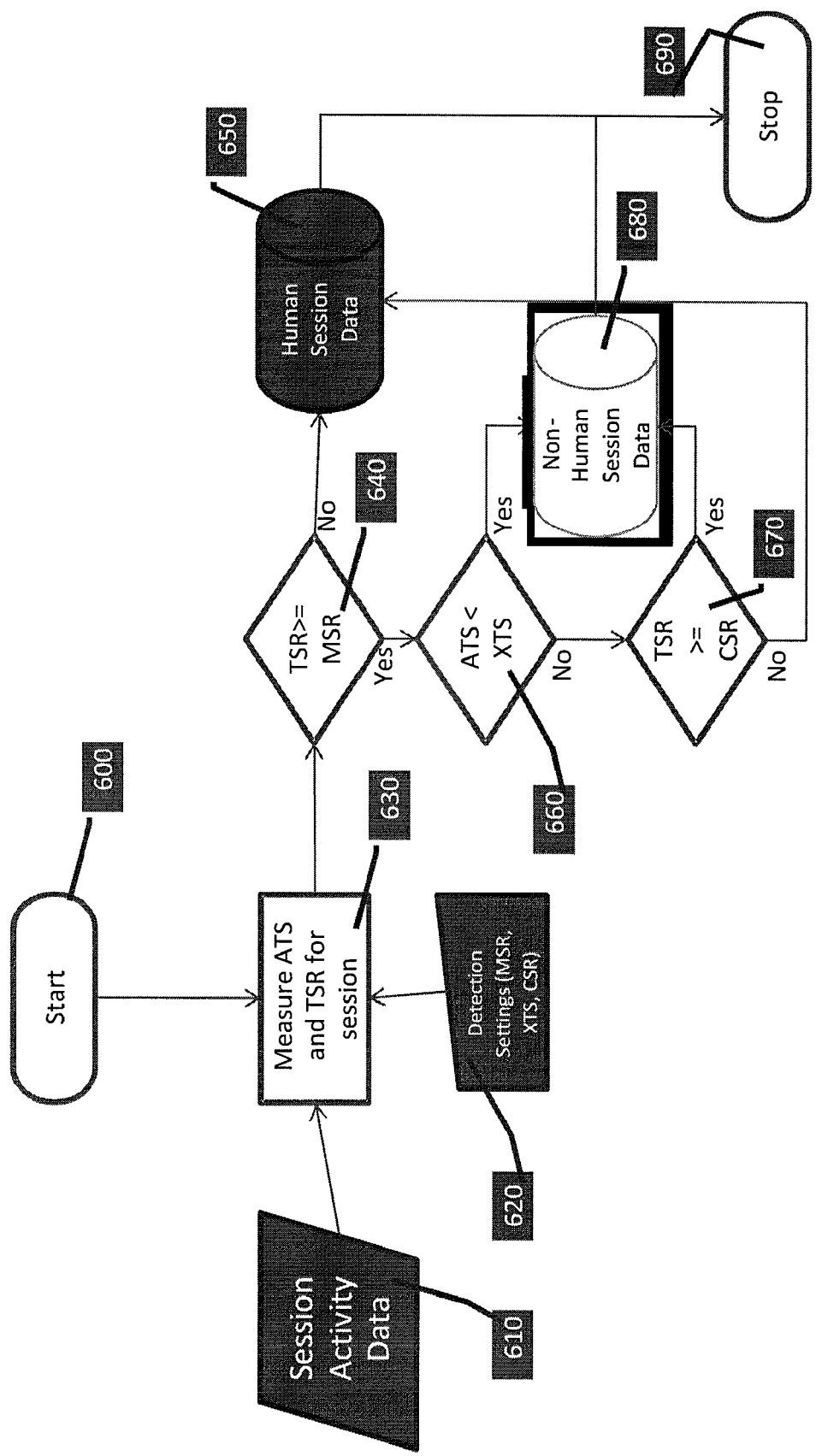
FIG. 6 is a flow diagram depicting an operational scenario of an example system for behavioral identification of non-human web sessions.

FIG. 6 depicts a flow diagram showing an operational scenario of an example system for behavioral identification of non-human web sessions. FIG. 6 depicts process 630 generating website interaction behavioral metrics (e.g., ATS and TSR) and then analyzing these metrics with respect to certain detection settings at decision blocks 640, 660, and 670. The analysis is then used to discern between non-human and human sessions. The following examples illustrate the application of this process to identify non-human sessions, and also show how human sessions are properly detected as well.

The detection settings 620 used to tune the system in each example are: MSR=100 requests; XTS=5 seconds; and CSR=300 requests. Each example includes detailed data samples representative of the visitor's session activity data 610.

Example 1

Fast, Long Session by a Spider

Session Type: Spider, Robot, or Crawler
Corresponds to Session 1 Activity Data depicted at 210 in FIG. 2
The table below illustrates session data for an example non-human visitor that travels very quickly and deeply into the web site. Notice that the pages accessed are the same as a human visitor would access, but the access time is very fast and, also, a very large number of pages is accessed.

| Page Accessed | Date | Time | Seconds Since Last Request |
| --- | --- | --- | --- |
| /index.html | Jun. 30, 2005 | 8:32:00 | |
| /page2.html | Jun. 30, 2005 | 8:32:04 | 4 |
| /page3.html | Jun. 30, 2005 | 8:32:04 | 0 |
| /folder1/page4.php | Jun. 30, 2005 | 8:32:05 | 1 |

. . . (149 additional page accesses with similar time between clicks) . . .
Session Metrics
ATS: 2 seconds
TSR: 153 requests
Conclusion: non-human visitor detected When the data in the above table is processed by the BINS process, ATS and TSR are computed at 630 by averaging the time between requests, and counting the total number of requests, respectively. At decision point 640, TSR is greater than MSR, indicating that this behavior meets the minimum number of requests for the session to be considered non-human. At decision point 660, ATS is less than XTS, indicating that the request behavior is too fast to be considered that of a human, and the session is identified as a non-human session 680, and processing stops at 690. This is correct, as a human would not access over 153 pages with an average time between clicks of just 2 seconds.

Example 2

Long Session by Human-Emulating ("Smart") Spider, Robot, or Crawler

Session Type: Spider, Robot, or Crawler
Corresponds to Session 2 Activity Data depicted at 210 in FIG. 2
The table below illustrates session data for an example non-human visitor (specifically a spider) that is programmed to behave like a human, in order to crawl the site without being flagged as a spider. In this case, the spider transmits requests less frequently, with random time intervals, but still travels deeply through the site. Notice the extended time spent on each page.

| Page Accessed | Date | Time | Seconds Since Last Request |
| --- | --- | --- | --- |
| /index.html | Jun. 30, 2005 | 8:32:00 | |
| /page2.html | Jun. 30, 2005 | 8:32:25 | 25 |
| /page3.html | Jun. 30, 2005 | 8:32:32 | 5 |
| /folder1/page4.php | Jun. 30, 2005 | 8:32:42 | 10 |

. . . (396 additional page accesses with similar time between clicks) . . .
Session Metrics
ATS: 15 seconds
TSR: 400 requests
Conclusion: non-human visitor detected When the data in the above table is processed by the BINS process, ATS and TSR are computed at 630 by averaging the time between requests, and counting the total number of requests, respectively. At decision point 640, TSR is greater than MSR, indicating that this behavior meets the minimum number of requests for the session to be considered non-human. At decision point 660, ATS is greater than XTS, indicating that the request behavior is slow enough to be considered human. At decision point 670, TSR is greater than CSR, indicating that the number of requests in this session is higher than a human would have generated in a single session. The session is identified as a non-human session 680, and processing stops at 690.

Example 3

Detecting a Pinger

Session Type: Pinger
Corresponds to Session 3 Activity Data depicted at 210 in FIG. 2

The table below illustrates web session data for an example non-human visitor (specifically a pinger) that is programmed to check the status of a web site every 300 seconds, to ensure the site is still available.

| Page Accessed | Date | Time | Seconds Since Last Request |
| --- | --- | --- | --- |
| /index.html | Jun. 30, 2005 | 8:00:00 | |
| /index.html | Jun. 30, 2005 | 8:05:00 | 300 |
| /index.html | Jun. 30, 2005 | 8:10:00 | 300 |
| /index.html | Jun. 30, 2005 | 8:15:00 | 300 |

... (596 additional page accesses to /index.html, at 300 second intervals) ...
Session Metrics
ATS: 300 seconds
TSR: 600 requests
Conclusion: non-human visitor detected When the data in the above table is processed by the BINS process, ATS and TSR are computed at 630. At decision point 640, TSR is greater than MSR, indicating that this behavior meets the minimum number of requests for the session to be considered non-human. At decision point 660, ATS is greater than XTS, indicating that the request behavior is slow enough to be considered human. At decision point 670, TSR is greater than CSR, indicating that the number of requests in this session is higher than a human would have generated in a single session. The session is identified as a non-human session 680, and processing stops at 690. This is correct, as a human would not access 600 pages in a single session, especially with the exact same time elapsing between requests.

Example 4

Short Session by a Fast Human Visitor

Session Type: Human
Corresponds to Session 4 Activity Data depicted at 210 in FIG. 2

The table below illustrates web session data for a human visitor who is likely very familiar with the first few pages of the site. The visitor loads the main page of the site, then loads page2.html one second later, and then loads page3.html two seconds later. The visitor reads page 3 for approximately ten seconds (e.g., perhaps checking the weather forecast), and then the visitor clicks on /folder1/page4.php before exiting the site.

| Page Accessed | Date | Time | Seconds Since Last Request |
| --- | --- | --- | --- |
| /index.html | Jun. 30, 2005 | 8:32:00 | |
| /page2.html | Jun. 30, 2005 | 8:32:01 | 1 |
| /page3.html | Jun. 30, 2005 | 8:32:03 | 2 |
| /folder1/page4.php | Jun. 30, 2005 | 8:32:13 | 10 |

Session Metrics
ATS: 3.25 seconds
TSR: 4 requests
Conclusion: non-human visitor NOT detected When the data in the above table is processed using the BINS process, ATS and TSR are computed at 630. At decision point 640, TSR is less than MSR, indicating that this behavior did not generate the minimum number of requests for the session to be considered non-human. The session is classified as a human session 650, and processing stops at 690. The conclusion is correct, as this is a human visitor.

Example 5

A Normal Human Visitor

Session Type: Human
Corresponds to Session 5 Activity Data depicted at 210 in FIG. 2

The table below illustrates web session data for a normal human visitor who is browsing the site at an average pace. The visitor loads the main page of the site, then loads page2.pdf four seconds later, spends 10 minutes (600 seconds) reading page2.pdf, and then loads page3.html. The visitor reads page3.html for 25 seconds (e.g., perhaps checking the weather), and then continues browsing at a normal pace, accessing 25 more pages (not listed in detail in the table) before exiting the site.

| Page Accessed | Date | Time | Seconds Since Last Request |
| --- | --- | --- | --- |
| /index.html | Jun. 30, 2005 | 8:32:00 | |
| /page2.pdf | Jun. 30, 2005 | 8:32:04 | 4 |
| /page3.html | Jun. 30, 2005 | 8:42:04 | 600 |
| /folder1/page4.php | Jun. 30, 2005 | 8:42:29 | 25 |

( ... this visitor continues browsing at a normal pace, accessing 25 additional pages ... )
Session Stats
ATS 35 seconds
TSR: 29 requests
Conclusion: non-human visitor NOT detected When the data in the above table is processed using the BINS process, ATS and TSR are computed at 630. At decision point 640, TSR is greater than MSR, indicating that this behavior meets the minimum number of requests for the session to be considered non-human. At decision point 660, ATS is greater than XTS, indicating that the request behavior is slow enough to be considered human. At decision point 670, TSR is less than CSR, indicating that the number of requests in this session is low enough to be considered human. The session is identified as a human session 650, and processing stops at 690. The conclusion is correct, as this is a human visitor.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an example of the wide scope of the systems and methods disclosed herein, the results from the systems and methods can be used for many different purposes, such as to more accurately assess how users (e.g., customers) are really using a web site. In other words, if a company cannot adequately detect and filter robotic traffic, then the company's assessment of how its website is being used by its customers will be dramatically affected by the robotic traffic. A more accurate customer usage assessment can lead to improvements in the website because, among other things, the web site can be more finely tuned to what the customers want (e.g., by placing different content on the website, such as different product and service offerings).

Figure 7:
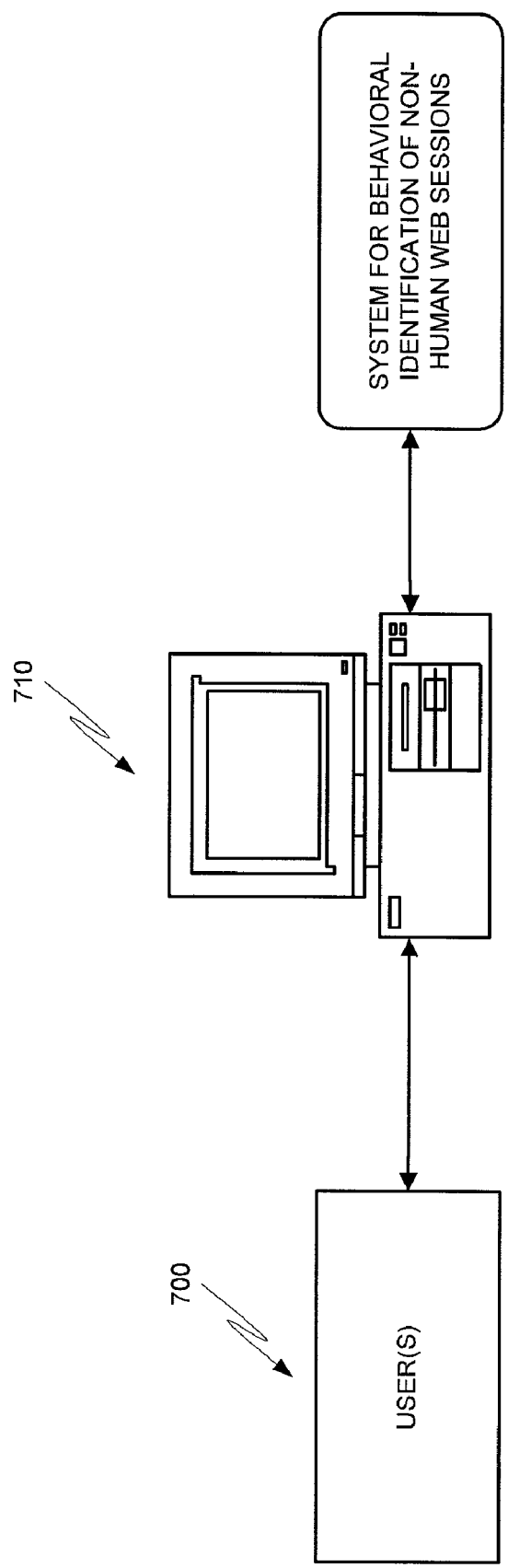
FIG. 7 depicts an example system in which one or more users may interact with an example system for behavioral identification of non-human web sessions.

It is further noted that the systems and methods may be implemented on various types of computer architectures, such as for example on a single general purpose computer (as shown at 710 on FIG. 7) or workstation, operated by one or more users 700, or on a networked system, or in a client-server configuration, or in an application service provider configuration.

Further, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

In addition, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for analyzing website interactions, comprising:
    receiving, using one or more data processors, one or more behavioral detection settings corresponding to threshold values that are used to detect whether a website visitor is human or non-human, wherein the detection settings include a minimum session requests threshold, a maximum time spacing threshold, and a certain session requests threshold;
    receiving, using the one or more data processors, session data, wherein the session data includes one or more website visitor requests associated with a session;
    analyzing, using the one or more data processors, the session data to determine interaction metrics for the session, wherein the interaction metrics include a total session requests metric and an average time spacing metric, and wherein the total session requests metric identifies a number of web page requests made by the website visitor during the session;
    classifying, using the one or more data processors, the visitor as a human visitor when the total session requests metric is less than the minimum session requests threshold;
    classifying, using the one or more data processors, the visitor as a non-human visitor when the total session requests metric is greater than the minimum session requests threshold and when the average time spacing metric is less than the maximum time spacing threshold
    classifying, using the one or more data processors, the visitor as a non-human visitor when the total session requests metric is greater than the minimum session requests threshold, when the average time spacing metric is greater than the maximum time spacing threshold, and when the total session requests metric is greater than the certain session requests threshold; and
    classifying, using the one or more data processors, the visitor as a human visitor when the total sessions request metric is greater than the minimum session requests threshold, when the average time spacing metric is greater than the maximum time spacing threshold, and when the total session requests metric is less than the certain session requests threshold.

2. The method of claim 1, wherein the detection settings are adjustable.

3. The method of claim 1, wherein the session data is clickstream data.

4. The method of claim 1, further comprising:
    storing the session data when the visitor is classified as a human visitor, wherein the stored session data is usable for website activity analysis.

5. The method of claim 1, wherein the visitor is classified as a non-human visitor, and wherein the non-human visitor is a bot, a smart bot, or a pinger.

6. The method of claim 1, wherein the maximum time spacing threshold is less than eight seconds, and wherein the certain session requests threshold is less than 10,000.

7. The method of claim 1, further comprising:
storing the session data in a first data store when the visitor is classified as a human visitor; and
storing the session data in a second data store when the visitor is classified as a non-human visitor.

8. The method of claim 1, wherein the method is performed in a batch mode, and wherein batch mode includes analyzing multiple sessions in sequence.

9. The method of claim 1, wherein the session data includes a request for a webpage associated with a website.

10. The method of claim 1, further comprising:
analyzing performance of the website based upon the visitor classification.

11. The method of claim 1, further comprising:
compensating a referrer based upon the visitor classification.

12. The method of claim 1, further comprising:
generating a website usage assessment based upon the visitor classification.

13. The method of claim 12, wherein the website usage assessment includes statistics regarding activity.

14. The method of claim 13, wherein content on a website is modified based upon the website usage assessment.

15. The method of claim 1, wherein the visitor is classified as a non-human visitor when the total session requests metric is greater than or equal to the minimum session requests threshold and when the average time spacing metric is less than the maximum time spacing threshold.

16. The method of claim 1, wherein the visitor is classified as a non-human visitor when the total session requests metric is greater than the minimum session requests threshold, when the average time spacing metric is greater than the maximum time spacing threshold, and when the total session requests metric is greater than or equal to the certain session requests threshold.

17. The method of claim 1, wherein the total session requests metric measures a total number of website visitor requests during a session, and wherein the average time spacing metric measures an average time between website visitor requests during a session.

18. The method of claim 1, wherein the minimum sessions request threshold requires a minimum number of website visitor requests during a session to classify a visitor as a non-human.

19. The method of claim 1, wherein when the visitor is classified as a non-human visitor and wherein when the average time spacing metric is less than the maximum time spacing threshold, the visitor is classified as a bot.

20. The method of claim 1, wherein when the visitor is classified as a non-human visitor, wherein when the average time spacing metric is greater than the maximum time spacing threshold, and wherein the total session requests metric is greater than the certain session requests threshold, the visitor is classified as a smart bot or pinger.

21. A computer-implemented system for analyzing website interactions, comprising:
one or more data processors;
one or more computer-readable storage mediums containing instructions configured to cause the one or more processors to perform operations including:
receiving one or more behavioral detection settings corresponding to threshold values that are used to detect whether a website visitor is human or non-human, wherein the detection settings include a minimum session requests threshold, a maximum time spacing threshold, and a certain session requests threshold;
receiving session data, wherein the session data includes one or more website visitor requests associated with a session;
analyzing the session data to determine interaction metrics for the session, wherein the interaction metrics include a total session requests metric and an average time spacing metric, and wherein the total session requests metric identifies a number of web page requests made by the website visitor during the session;
classifying the visitor as a human visitor when the total session requests metric is less than the minimum session requests threshold;
classifying the visitor as a non-human visitor when the total session requests metric is greater than the minimum session requests threshold and when the average time spacing metric is less than the maximum time spacing threshold
classifying the visitor as a non-human visitor when the total session requests metric is greater than the minimum session requests threshold, when the average time spacing metric is greater than the maximum time spacing threshold, and when the total session requests metric is greater than the certain session requests threshold; and
classifying the visitor as a human visitor when the total sessions request metric is greater than the minimum session requests threshold, when the average time spacing metric is greater than the maximum time spacing threshold, and when the total session requests metric is less than the certain session requests threshold.

22. A computer-program product for analyzing website interactions, tangibly embodied in a machine-readable non-transitory storage medium, including instructions configured to cause a data processing apparatus to:
receive one or more behavioral detection settings corresponding to threshold values that are used to detect whether a website visitor is human or non-human, wherein the detection settings include a minimum session requests threshold, a maximum time spacing threshold, and a certain session requests threshold;
receive session data, wherein the session data includes one or more website visitor requests associated with a session;
analyze the session data to determine interaction metrics for the session, wherein the interaction metrics include a total session requests metric and an average time spacing metric, and wherein the total session requests metric identifies a number of web page requests made by the website visitor during the session;
classify the visitor as a human visitor when the total session requests metric is less than the minimum session requests threshold;
classify the visitor as a non-human visitor when the total session requests metric is greater than the minimum session requests threshold and when the average time spacing metric is less than the maximum time spacing threshold
classify the visitor as a non-human visitor when the total session requests metric is greater than the minimum session requests threshold, when the average time spacing metric is greater than the maximum time spacing threshold, and when the total session requests metric is greater than the certain session requests threshold; and classify the visitor as a human visitor when the total sessions request metric is greater than the minimum session requests threshold, when the average time spacing metric is greater than the maximum time spacing threshold, and when the total session requests metric is less than the certain session requests threshold.

\* \* \* \* \*